United States Patent
Kuriyama et al.

(10) Patent No.: US 8,023,995 B2
(45) Date of Patent: Sep. 20, 2011

(54) RADIO FREQUENCY DEVICE AND MOBILE COMMUNICATION TERMINAL USING THE SAME

(75) Inventors: Akira Kuriyama, Kokubunji (JP); Taizo Yamawaki, Tokyo (JP); Satoshi Tanaka, Kokubunji (JP)

(73) Assignee: Renesas Electronics Corporation, Kawasaki-shi (JP)

( * ) Notice: Subject to any disclaimer, the term of this patent is extended or adjusted under 35 U.S.C. 154(b) by 0 days.

(21) Appl. No.: 11/028,925

(22) Filed: Jan. 5, 2005

(65) Prior Publication Data
US 2005/0221855 A1    Oct. 6, 2005

(30) Foreign Application Priority Data

Mar. 31, 2004   (JP) .................................. 2004-102484

(51) Int. Cl.
*H04M 1/00* (2006.01)
(52) U.S. Cl. .................................. 455/553.1; 455/552.1
(58) Field of Classification Search ............... 455/552.1, 455/553.1
See application file for complete search history.

(56) References Cited

U.S. PATENT DOCUMENTS

| | | | | |
|---|---|---|---|---|
| 6,054,902 | A | 4/2000 | Masato | 330/306 |
| 6,091,966 | A * | 7/2000 | Meadows | 455/553.1 |
| 6,252,461 | B1 * | 6/2001 | Raab | 330/302 |
| 6,317,608 | B1 * | 11/2001 | Glocker | 455/553.1 |
| 6,819,941 | B2 * | 11/2004 | Dening et al. | 455/552.1 |
| 6,943,624 | B2 | 9/2005 | Ohnishi et al. | |
| 6,990,357 | B2 * | 1/2006 | Ella et al. | 455/553.1 |
| 7,050,769 | B2 | 5/2006 | Imai et al. | |
| 7,058,364 | B2 * | 6/2006 | Atkinson et al. | 455/76 |
| 2002/0030541 | A1 * | 3/2002 | Tsutsui et al. | 330/133 |
| 2002/0049075 | A1 * | 4/2002 | Takagi | 455/553 |
| 2003/0025555 | A1 * | 2/2003 | Ohnishi et al. | 330/124 R |
| 2003/0032396 | A1 | 2/2003 | Tsuchiya et al. | |
| 2004/0087280 | A1 * | 5/2004 | Watanabe et al. | 455/83 |
| 2004/0162107 | A1 * | 8/2004 | Klemetti et al. | 455/553.1 |

FOREIGN PATENT DOCUMENTS

| | | |
|---|---|---|
| CN | 1324514 A | 11/2001 |
| CN | 2562497 Y | 7/2003 |
| EP | 1 289 159 | 3/2006 |
| JP | 09-162602 | 6/1997 |
| JP | 9-232887 | 9/1997 |
| JP | 10-56340 | 2/1998 |
| JP | 11-112251 | 4/1999 |
| JP | 11-186803 | 7/1999 |

(Continued)

*Primary Examiner* — George Eng
*Assistant Examiner* — Muthuswamy Manoharan
(74) *Attorney, Agent, or Firm* — Miles & Stockbridge P.C.

(57) ABSTRACT

There is provided a radio frequency circuit device for multi-band and multi-mode which is low in a circuit loss, and a mobile communication terminal using the radio frequency circuit device. The radio frequency circuit device has a first path 110 that includes an amplifier 10a that amplifies signals of at least two modulation techniques in power, a matching network 20 that is connected to the amplifier and a duplexer 50 and allows the matching network to be coupled with an antenna, and a second path 111 that does not include the duplexer and allows the matching network to be coupled with the antenna. The first path is selected when the amplifier amplifies one of the signals of at least two modulation techniques, and the second path is selected when the amplifier amplifies another signal. An output impedance of the amplifier is matched with an impedance when viewing the antenna side from the amplifier in the first path and the second path.

4 Claims, 10 Drawing Sheets

FOREIGN PATENT DOCUMENTS

| | | |
|---|---|---|
| JP | 2002-171194 | 6/2002 |
| JP | 2002-517122 | 6/2002 |
| JP | 2003-46340 | 2/2003 |
| JP | 2003-46452 | 2/2003 |
| JP | 2003-51751 | 2/2003 |
| JP | 2003-78441 | 3/2003 |
| WO | WO 99/62195 | 12/1999 |
| WO | WO 00/24124 * | 4/2000 |
| WO | WO 00/24124 A1 | 4/2000 |

* cited by examiner

US 8,023,995 B2

RADIO FREQUENCY DEVICE AND MOBILE COMMUNICATION TERMINAL USING THE SAME

CLAIM OF PRIORITY

The present application claims priority from Japanese application JP 2004-102484 filed on Mar. 31, 2004, the content of which is hereby incorporated by reference into this application.

FIELD OF THE INVENTION

The present invention relates to a radio frequency circuit device suitable for a mobile communication terminal, and more particularly to a radio frequency circuit device that deals with a plurality of signals that are different in a frequency band or a modulation technique from each other and a mobile communication terminal using the radio frequency circuit device.

BACKGROUND OF THE INVENTION

A mobile communication terminal represented by a cellular phone becomes increasingly popular around the world. A radio frequency circuit for use in the mobile communication terminal is disclosed in, for example, Japanese Patent Laid-Open No. H9-232887, Japanese Patent Laid-Open No. H10-56340 and Japanese Patent Laid-Open No. H11-112251.

An example of a radio frequency circuit disclosed in Japanese Patent Laid-Open No. H9-232887 will be described with reference to FIG. 1 of the publication. A radio frequency power amplifier shown in FIG. 1 includes an input matching network 10 that optimizes the impedance of an input signal and outputs a signal, a gallium arsenide power FET (field effect transistor) 21 that amplifies and outputs the signal that is outputted from the input matching network 10, a first output matching network 30 and a second output matching network 40 which optimize the impedance $\Gamma L^*$ of an output signal of the gallium arsenide power FET 21 according to a frequency band and outputs a signal, and a switch 27 that is connected between the gallium arsenide power FET 21 and the respective output matching networks 30 and 40. The switch 27 selects an optimum output matching network from the first and second output matching networks 30 and 40, and connects the gallium arsenide power FET 21 and the selected output matching network.

Another example of a radio frequency circuit disclosed in Japanese Patent Laid-Open No. H 10-56340 will be described with reference to FIG. 1 of that publication. A radio frequency amplifier shown in FIG. 1 includes a low-pass type input matching network 34 that matches two signals A1 (center frequency 902.5 MHz) and A2 (center frequency 1440 MHz), and a power amplifier circuit 37 that amplifies the transmitter input signals A1 and A2 that have been matched by the low-pass type input matching network 34 to a degree that can be used as the respective transmitter electric waves of a cellular phone and outputs its result as output signals B1 (center frequency 902.5 MHz) and B2 (center frequency 1440 MHz). In addition, the radio frequency amplifier includes a low-pass type output matching network 44 that is connected to an output side of the power amplifier circuit 37 and matches the transmitter output signal B1, and a high-pass type output matching network 49 that is connected in parallel with the low-pass type output matching network 44 at an output side of the power amplifier circuit 37 and matches the transmitter output signal B2. Then, the low-pass type output matching network 44 matches the transmitter output signal B1, and cuts off the transmitter output signal B2. Similarly, the high-pass output matching network 49 matches the transmitter output signal B2, and cuts off the transmitter output signal B1.

Subsequently, still another example of a radio frequency circuit disclosed in Japanese Patent Laid-Open No. H11-112251 will be described with reference to FIGS. 1 and 5 of this publication. A two-band radio frequency power amplifier shown in FIGS. 1 and 5 includes a stabilizer circuit A that is made up of a first resistor 101, a condenser 103, a third resistor 111, a line of quarter wavelength 112, and watersheds 113 and 114, a field effect transistor 104, input terminals 201 and 202, output terminals 203 and 204, and matching networks 211 to 214. In addition, the amplifier has a low-pass filter 402, an antenna switch 403 and an antenna 404 at an output side thereof. A signal of a first frequency band that is inputted from the input terminal 201 is amplified by the field effect transistor 104 and then outputted from the output terminal 203. An unnecessary harmonic distortion is suppressed from the signal by the low-pass filter 404, and the signal is transmitted from the antenna 404 through the antenna switch 403. Similarly, a signal of a second frequency band that is inputted from the input terminal 202 is magnified by the field effect transistor 104 and then outputted from the output terminal 204. An unwanted harmonic distortion is suppressed from the signal by the low-pass filter 402, and the signal is transmitted from the antenna 404 through the antenna switch 403.

SUMMARY OF THE INVENTION

The key to popularize the mobile communication terminal is to downsize the terminal and reduce the costs. In addition, it is important that the mobile communication terminal responds to a plurality of signals that are different in the frequency band and the modulation technique. For this reason, there are a multi-band system that is responsive to a plurality of frequency bands and a multi-mode system that is responsive to a plurality of modulation techniques. In the radio frequency circuit device that makes up the mobile communication terminal, a part of the circuit is shared by the plurality of frequency bands and the plurality of modulation techniques in order to make the mobile communication terminal responsive to the multi-band system and the multi-mode system while downsizing the terminal and reducing the costs.

In the amplifier disclosed in Japanese Patent Laid-Open No. H9-232887, the power FET is shared by the plurality of frequency bands. However, because the switch is disposed between the transistor output terminal that is low in the impedance and the matching network, a circuit loss downstream of the transistor output terminal increases due to a parasitic resistance of the switch, and the performance of the radio frequency power amplifier is not prevented from being deteriorated.

In the amplifier disclosed in Japanese Patent Laid-Open No. H 10-56340, the power amplifier circuit is shared by different frequencies. However, because one of the output matching networks is made up of a low-pass type circuit, and the other output matching network is made up of a high-pass type circuit, in the case where the frequency bands of two signals are in proximity to each other, it is difficult to realize the low-pass type circuit or the high-pass type circuit which allows only the signal of one frequency band to pass therethrough and cuts off the signal of the other frequency band.

In the amplifier disclosed in Japanese Patent Laid-Open No. H11-112251, the field effect transistor is shared by two bands. However, because the output matching networks that correspond to the respective signals of the two frequency bands are connected to the same low-pass filter and the same antenna switch, it is impossible to use a circuit block to be disposed between the radio frequency power amplifier and the antenna in the case where the modulation technique is different. Therefore, it is difficult to make the mobile communication terminal responsive to the multi-mode system.

An object of the present invention is to provide a radio frequency circuit device that is low in a circuit loss applicable to a multi-band and multi-mode system, and a mobile communication terminal using the radio frequency circuit device.

The outline of typical embodiments of the present invention described in the present application will be described in brief below.

The radio frequency circuit device includes an amplifier that amplifies the power of signals of at least two modulation techniques, a matching network that is connected to an output terminal of the amplifier, and a first path that includes a duplexer between the matching network and the antenna and is constituted such that the amplifier is coupled to the antenna through the duplexer, and a second path that includes no duplexer and is constituted such that the amplifier is coupled to the antenna through the matching network. In the case where the amplifier amplifies one signal of at least two modulation techniques, the first path is selected. In the case where the amplifier amplifies another signal of the at least two modulation techniques, the second path is selected. In the first path and the second path, the output impedance of the amplifier and the impedance when viewing the antenna side from the amplifier are matched with each other.

The matching network is connected to the output terminal of the amplifier, and the first path and the second path that are responsive to different modulation techniques from each other share the amplifier and the matching network. In addition, any one of the first path and the second path is selected at the output side of the matching network that can increase the impedance. Therefore, it is expected to realize the radio frequency circuit device that is low in the circuit loss applicable to the multi-band and the multi-mode.

These and other objects and many of the attendant advantages of the invention will be readily appreciated, as the same becomes better understood by reference to the following detailed description when considered in connection with the accompanying drawings.

DETAILED DESCRIPTION OF THE PREFERRED EMBODIMENTS

Now, a description will be given in more detail of a radio frequency circuit device and a mobile communication terminal using the radio frequency circuit device according to preferred embodiments of the present invention with reference to the accompanying drawings. In all of the drawings, members having identical or similar functions are designated by the same symbols, and its duplex description will be omitted.

First Embodiment

Figure 1:
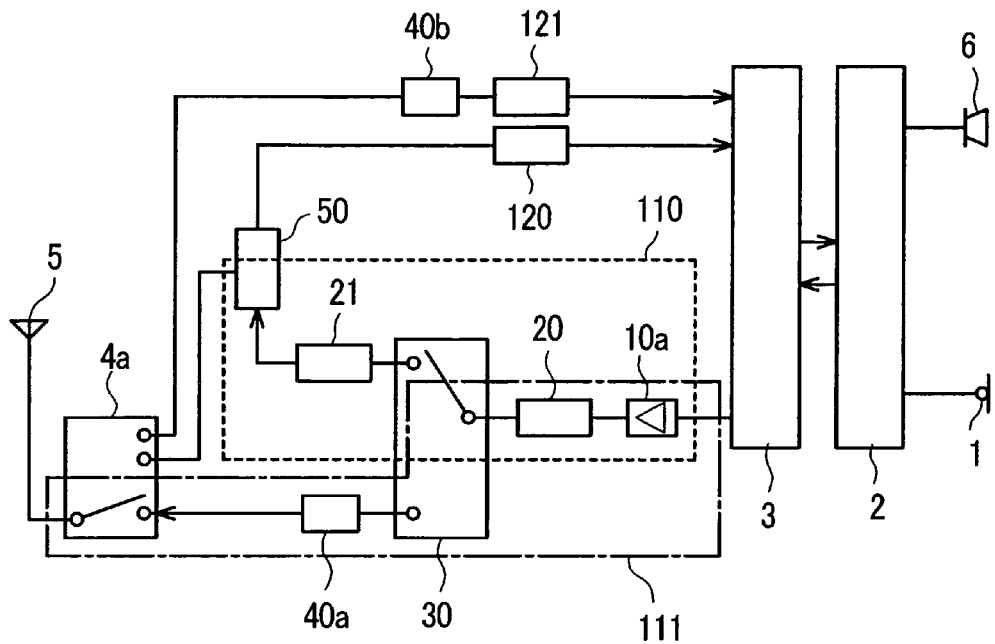
FIG. 1 is a circuit block diagram for explaining a radio frequency circuit device and a mobile communication terminal using the radio frequency circuit device according to a first embodiment of the present invention.

FIG. 1 shows a first embodiment of the present invention. Referring to FIG. 1, reference numeral 1 denotes a microphone, 2 is a baseband signal processor, and 3 is a frequency converter circuit device (hereinafter referred to as "RF-IC") that converts a baseband signal into a radio frequency signal, or converts the radio frequency signal into the baseband signal. Also, reference 10a denotes a radio frequency power amplifier, 20 and 21 are matching networks, 30 is a switch, 40a is a filter, 50 is a duplexer, 4a is an antenna switch, and 5 is an antenna. Reference numeral 110 surrounded by a dotted line in FIG. 1 and reference numeral 111 surrounded by a dashed line in FIG. 1 denote the first transmitter path including the duplexer 50 and the second transmitter path including no duplexer 50, respectively. In addition, reference 40b denotes a filter, 120 and 121 are radio frequency receiver circuit devices, and 6 is a speaker. The mobile communication terminal is constituted by all of the elements shown in FIG. 1, and the radio frequency circuit device is constituted by the elements including the RF-IC 3 to the antenna switch 4a.

This embodiment does not depend on the number of frequency bands (the number of bands) and the number of modulation techniques (the number of modes). For simplification of description, in the following description, there is exemplified a response to two-bands and two modes of a DCS (digital communication system) system of 1800 MHz band which has widely spread mainly in Europe and Asia, and a W-CDMA (wideband code division multiple access) system of 1900 MHz band which is of a third generation mobile communication system.

Hereinafter, the operation of this embodiment will be described. A sound signal that has been inputted from the microphone 1 is subjected to signal processing such as data compression or coding in the baseband signal processor 2, and then outputted as a baseband transmitter signal. The baseband signal is converted in frequency into a radio frequency transmitter signal in the RF-IC 3. The RF-IC 3 selects and outputs any one of a radio frequency transmitter signal TxA (not shown) for the W-CDMA system and a radio frequency transmitter signal TxB (not shown) for the DCS system.

The radio frequency transmitter signal TxA that has been outputted from the RF-IC 3 is amplified up to a desired power in the radio frequency power amplifier 10a, and then transmitted to the duplexer 50 through the matching network 20, the switch 30 and the matching network 21. In addition, the radio frequency transmitter signal TxA is transmitted from the antenna 5 through the antenna switch 4a from the duplexer 50.

Also, the radio frequency transmitter signal TxB that has been outputted from the RF-IC 3 is amplified up to a desired power in the radio frequency power amplifier 10a, and then transmitted to the antenna switch 4a through the matching network 20, the switch 30 and the filter 40a. Then, the radio frequency transmitter signal TxB is transmitted from the antenna 5.

On the other hand, a radio frequency receiver signal RxA (not shown) for the W-CDMA system that has been received by the antenna 5 is transmitted to the RF-IC 3 through the antenna switch 4a, the duplexer 50 and the radio frequency receiver circuit device 120. The radio frequency receiver signal RxA is then converted in frequency into a baseband receiver signal in the RF-IC 3, converted into a sound signal in the baseband signal processor 2, and thereafter outputted from the speaker 6.

Also, a radio frequency receiver signal RxB (not shown) for the DCS system that has been received by the antenna 5 is transmitted to the RF-IC 3 through the antenna switch 4a, the filter 40b and the radio frequency receiver circuit device 121. The radio frequency receiver signal RxB is then converted in frequency into a baseband receiver signal in the RF-IC 3, converted into a sound signal in the baseband signal processor 2, and thereafter outputted from the speaker 6.

Therefore, the switch 30 is connected to the matching network 21 side in the case of transmitting the signal by the W-CDMA system, and connected to the filter 40a side in the case of transmitting the signal by the DCS system. Also, the antenna switch 4a is connected to the duplexer 50 side in the case of transmitting and receiving the signal by the W-CDMA system, connected to the filter 40a side in the case of transmitting the signal by the DCS system, and connected to the filter 40b side in the case of receiving the signal by the DCS system.

As described above, the radio frequency circuit device including the elements of the RF-IC 3 to the antenna switch 4a has two paths consisting of the transmitter path 110 of the radio frequency transmitter signal TxA for the W-CDMA system and the transmitter path 111 of the radio frequency transmitter signal TxB for the DCS system.

Figure 2:
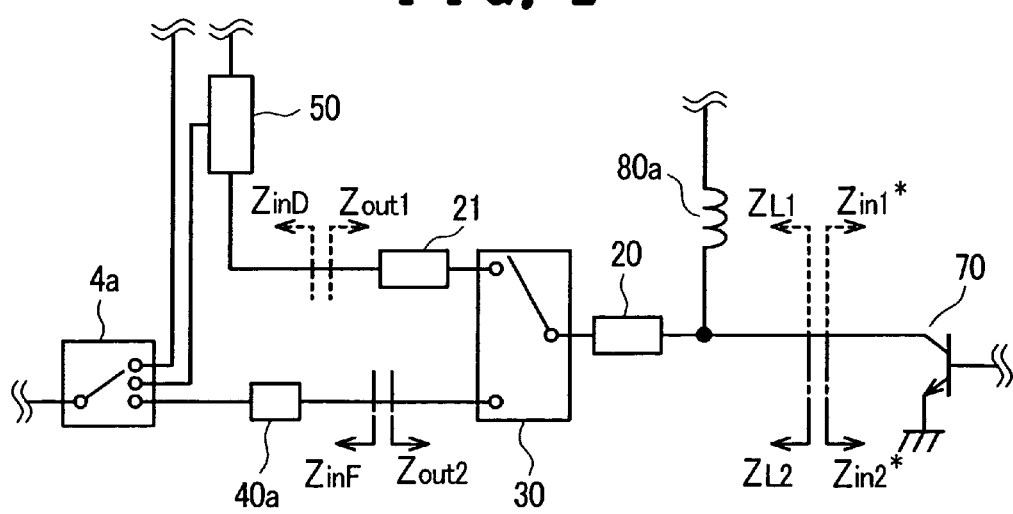
FIG. 2 is a circuit block diagram for explaining a transmitter circuit portion in the circuit block diagram shown in FIG. 1.

FIG. 2 shows a structure including a final stage of the radio frequency power amplifier 10a to the switch 4a in detail. Referring to FIG. 2, reference numeral 70 denotes a transistor that makes up the final stage of the radio frequency power amplifier 10a, and 80a is an inductor that is arranged in series to a line for driving power voltage supply of the transistor 70.

A circuit characteristic of this embodiment will be described with reference to FIG. 2. Referring to FIG. 2, reference $Z_{L1}$ denotes an optimum load impedance of the transistor 70 corresponding to the frequency and the output power of the W-CDMA system, $Z_{in1}$ is an impedance when viewing the duplexer 50 side from the input terminal of the matching network 20, $Z_{out1}$ is an impedance when viewing the transistor 70 side from the output terminal of the matching network 21, and $Z_{inD}$ is an input impedance of the duplexer 50. Also, reference $Z_{L2}$ denotes an optimum load impedance of the transistor 70 corresponding to the frequency and the output power of the DCS system, $Z_{in2}$ is an impedance when viewing the filter 40a side from the input terminal of the matching network 20, $Z_{out2}$ is an impedance when viewing the transistor 70 side from the output terminal of the DCS side of the switch 30, and $Z_{inF}$ is an input impedance of the filter 40a.

When the frequency or the output power of the transmitter radio frequency signal is different, the optimum load impedance of the same transistor is generally different. Accordingly, $Z_{L1} \neq Z_{L2}$ is met.

The impedance is described by a complex number such as $Z=X+jY$, and a complex conjugate number is represented by $Z^*=X-jY$. Also, in the case where the impedance when viewing one side from a certain point A on the circuit is Z, and the impedance when viewing an opposite side from the point A is $Z^*$, "conjugate matching" is realized at the point A, and a reflection loss that is attributable to impedance mismatching at the point A becomes zero. As a result, the impedance matching is taken at a certain point on the circuit, and the conjugate matching is generally employed.

In this embodiment, $Z_{out1}=Z_{inD}^*$, and $Z_{out2}=Z_{inF}^*$ are satisfied. Also, the impedance $Z_{out1}$ is converted into the impedance $Z_{in1}^*$ by the matching network 21, the switch 30 and the matching network 20, to thereby satisfy $Z_{L1}=Z_{in1}$ and realize the conjugate matching at the output terminal of the transistor 70. In addition, the impedance $Z_{out2}$ is converted into the impedance $Z_{in2}^*$ by the switch 30 and the matching network 20, to thereby satisfy $Z_{L2}=Z_{in2}$ and realize the conjugate matching at the output terminal of the transistor 70.

The inductor 80a is an inductive element that is arranged in series to the line for driving power voltage supply of the transistor 70, and generally used for sufficiently increasing the impedance of the driving power. Accordingly, the inductor 80a is almost irrelative to the impedance matching. For downsizing the circuit, the inductor 80a may be included in the matching network. Also, the inductor 80a may be formed of the inductive element such as a transmission line.

Figure 3:
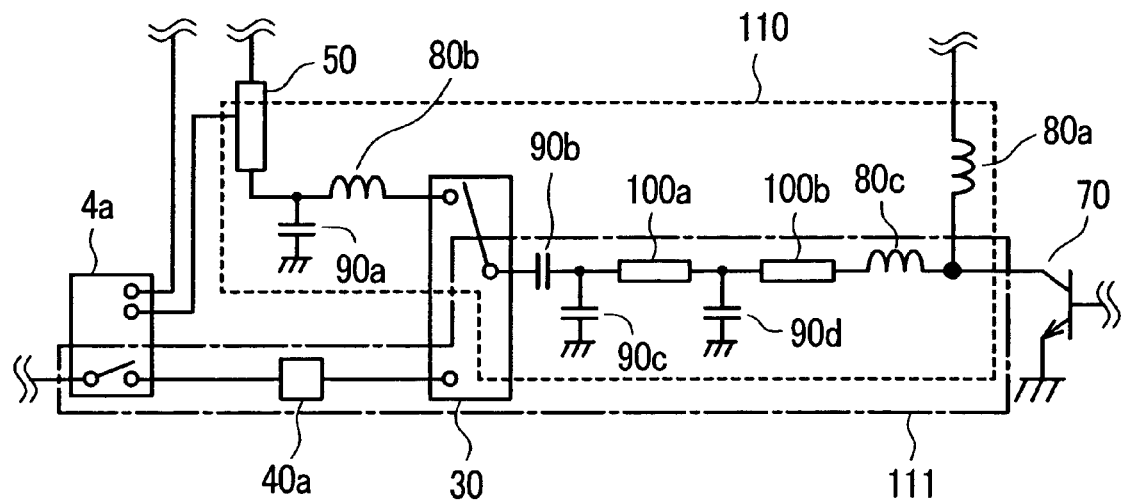
FIG. 3 is a circuit diagram for explaining a circuit example of a radio frequency transmitter circuit portion shown in FIG. 2.

Subsequently, an example of the circuit that realizes the radio frequency circuit device according to this embodiment will be described with reference to FIGS. 3 to 5. Referring to FIG. 3, reference 80a and 80c denote inductors, 90a to 90d are condensers, and 100a and 100b are transmission lines.

The matching network 21 is made up of the condenser 90a and the inductor 80a, and the matching network 20 is made up of the condensers 90b to 90d, the inductor 80c, and the transmission lines 110a and 110b.

Referring to FIG. 3, for simplification of description, the line for driving power voltage supply of the transistor 70 is connected to a connected point between the inductor 80c and the output terminal of the transistor 70. However, the present invention is not limited to this connected point, and the line for driving power voltage supply may be connected to another connected point convenient for design.

Figure 4:
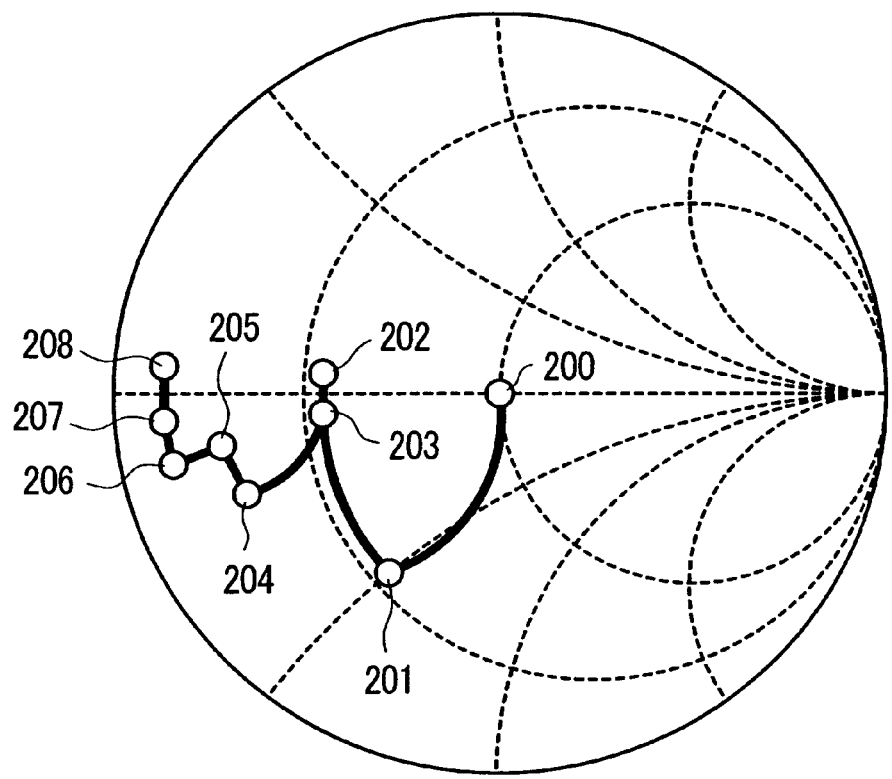
FIG. 4 is a Smith chart for explaining a principle of impedance matching in the circuit diagram of FIG. 3.

FIG. 4 is a Smith chart showing an impedance matching characteristic in the transmitter path 110 shown in FIG. 3 in the case of transmitting a signal through the W-CDMA system. FIG. 5 is a Smith chart showing an impedance matching characteristic in the transmitter path 111 shown in FIG. 3 in the case of transmitting a signal through the DCS system.

In this example, for convenience of description, it is assumed that $Z_{L1}=Z_{in1}=5-j3[\Omega]$, $Z_{L2}=Z_{in2}=3+j0[\Omega]$, $Z_{out1}=75+j0[\Omega]$, and $Z_{out2}=50+j0[\Omega]$ are satisfied. The values of $Z_{in1}$ and $Z_{in2}$ are about values when the output power of the radio frequency power amplifier is 27 dBm in the W-CDMA system and when it is 32 dBm in the DCS system, and when the driving power voltage of the power amplifying transistor is 3.5 V. Also, the value of $Z_{out1}$ is so set as to improve the ruggedness of an SAW (surface acoustic wave) element or the like that makes up the duplexer. Also, the value of $Z_{out2}$ is about a value obtained when the conjugate matching is realized with respect to the general impedances of the filter and the antenna switch. None of $Z_{in1}$, $Z_{in2}$, $Z_{out1}$ and $Z_{out2}$ is specified to the above values, and may be values convenient for design.

The principle of the impedance matching in the transmitter path 110 in the case of transmitting a signal through the W-CDMA system will be described with reference to FIGS. 3 and 4.

Referring to FIG. 4, an impedance point 200 that is in the center of the Smith chart is $Z_{out1}$=75+j0[Ω], and an impedance point 208 is $Z_{in1}$*=5+j3[Ω]. The impedance point 200 is converted in impedance into an impedance point 201 by the condenser 90a, and the impedance point 201 is converted in impedance into an impedance point 202 by the inductor 80a. Subsequently, the impedance point 202 is converted in impedance into an impedance point 203 by the condenser 90b, the impedance point 203 is converted in impedance into an impedance point 204 by the condenser 90c, and the impedance point 204 is converted in impedance into an impedance point 205 by the transmission line 100a. Furthermore, the impedance point 205 is converted in impedance into an impedance point 206 by the condenser 90d, the impedance point 206 is converted in impedance into an impedance point 207 by the transmission line 100b, and the impedance point 207 is converted in impedance into an impedance point 208 by the inductor 80c.

Subsequently, the principle of the impedance matching in the transmitter path 111 in the case of transmitting a signal through the DCS system will be described with reference to FIGS. 3 and 5.

Figure 5:
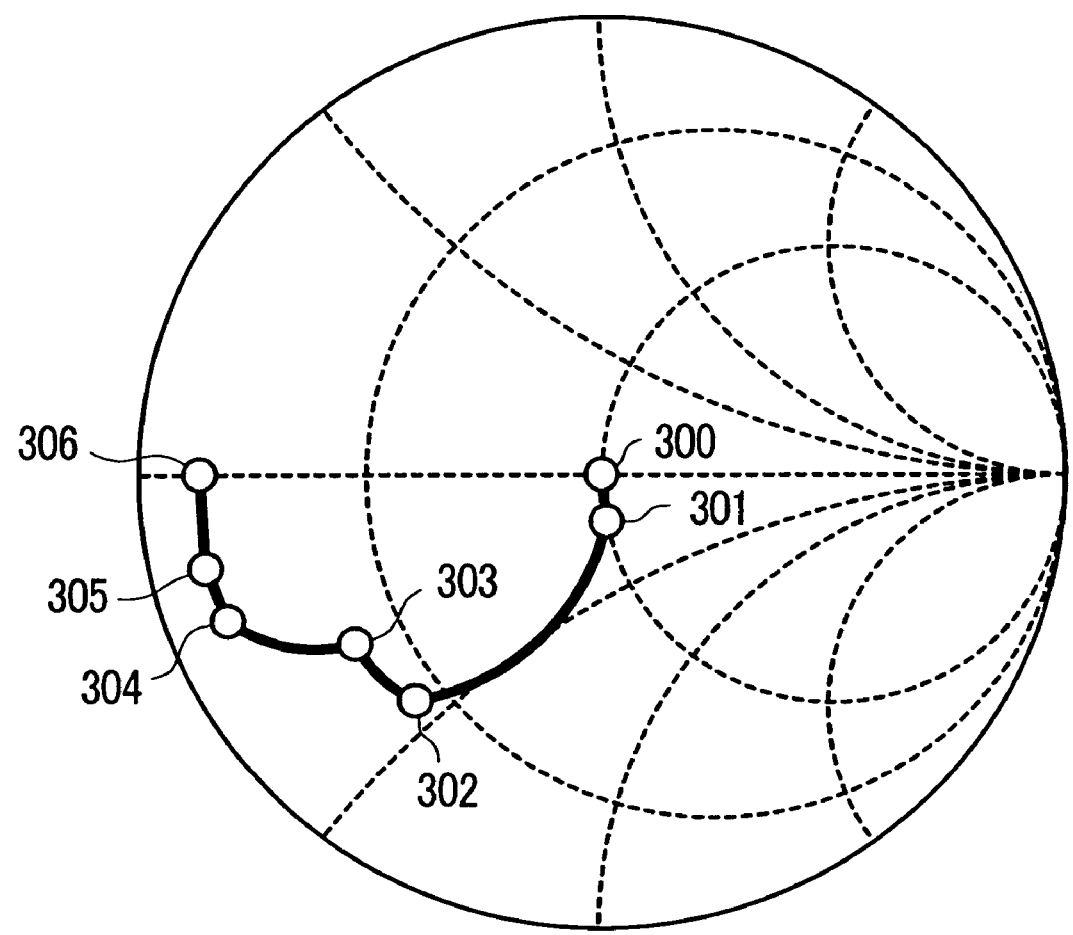
FIG. 5 is another Smith chart for explaining the principle of impedance matching in the circuit diagram of FIG. 3.

An impedance point 300 that is in the center of the Smith chart shown in FIG. 5 is $Z_{out2}$=50+j0[Ω], and an impedance point 306 is $Z_{in2}$*=3+j0[Ω]. The impedance point 300 is converted in impedance into an impedance point 301 by the condenser 90b, the impedance point 301 is converted in impedance into an impedance point 302 by the condenser 90c, and the impedance point 302 is converted in impedance into an impedance point 303 by the transmission line 100a. Subsequently, the impedance point 303 is converted in impedance into an impedance point 304 by the condenser 90d, the impedance point 304 is converted in impedance into an impedance point 305 by the transmission line 100b, and the impedance point 305 is converted in impedance into an impedance point 306 by the inductor 80c.

In the description of the principle of the impedance matching, the impedance conversion by the switch 30 is ignored.

As described above, because the switch 30 is arranged at the impedance point 202 in the transmitter path 110, for example, in the case where a real part of the impedance at the impedance point 202 is 25[Ω], and a series resistance of the switch 30 is 0.5[Ω], an increase in the circuit loss which is attributable to the arrangement of the switch is low to the degree of about 0.17 dB. Also, an increase in the circuit loss in the transmitter path 111 is low to the degree of about 0.09 dB. A real part of the impedance at the impedance point 202 is not limited to 25Ω, but may be set to another value.

Then, this embodiment can respond to the multi-band of the frequency bands consisting of 1800 MHz band and 1900 MHz band which are in proximity to each other by sharing the matching network 20. In addition, the provision of the switch 30 can respond to the DCS system that requires the arrangement of the switch for connection of the antenna, and the W-CDMA system that requires the arrangement of the duplexer for connection of the antenna.

According to this embodiment, it can be expected to realize a radio frequency circuit device that responds to the multi-band and multi-mode which are excellent in the transmitter circuit characteristic. Also, since the radio frequency power amplifier 10a and the matching network 20 are shared by the multi-band and multi-mode, it can be expected to downsize the radio frequency circuit device and reduce the costs.

An example of the values of the condensers, inductors and transmission lines that realize the above impedance matching is as follows. As condensers, the condenser 90a=1.5 pF, the condenser 90b=15 pF, the condenser 90c=3 pF, and the condenser 90d=5 pF. Also, as inductors, the inductor 80a=3.3 nH, and the inductor 80c=0.5 nH. In addition, as transmission lines, the transmission line 100a is a microstrip line of the length 2 mm and of the characteristic impedance 50Ω, and the transmission line 100b is a microstrip line of the length 4 mm and of the characteristic impedance 50Ω.

As the condensers 90a to 90d and the inductors 80a and 80c, generic electronic parts such as chip elements are used. Also, the condensers 90a to 90d and the inductors 80a and 80c can be formed of an IPC (integrated passive circuit) integrated on a compound semiconductor substrate made of silicon or gallium arsenide. The circuit area is downsized with the IPC.

Alternatively, the transistor 70, the condensers 90a to 90d, the inductors 80a and 80a, and the transmission lines 100a and 100b may be formed of a MMIC (monolithic microwave integrated circuit) integrated on the same substrate. In addition, the inductor 80c may be formed of a bonding wire that mainly contains gold as a structural element.

As the switch 30, a semiconductor switch or a MEMS (micro electronic mechanical system) switch may be used. In the case of using the MEMS switch, a lower circuit loss can be particularly obtained.

Also, as the transistor 70, a compound semiconductor hetero-junction bipolar transistor or a MOS (metal oxide semiconductor) field effect transistor can be used.

Second Embodiment

Figure 6:
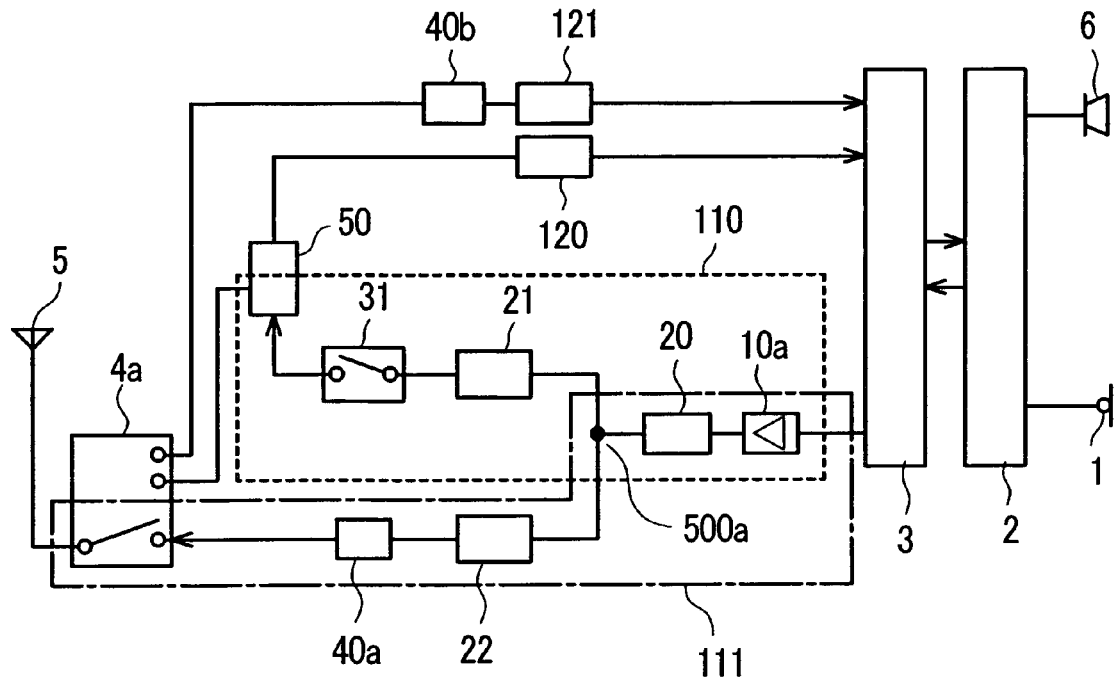
FIG. 6 is a first circuit block diagram for explaining a second embodiment of the present invention.

FIG. 6 shows a second embodiment of the present invention. Referring to FIG. 6, reference numeral 22 denotes a matching network, 31 is a switch, and 500a is a watershed that connects the transmitter path 110 and 111.

The circuit operation of this embodiment will be described with reference to FIG. 6. The operation of a circuit that is made up of a microphone 1, a baseband signal processor 2 and an RF-IC 3 and converts a sound signal into a radio frequency transmitter signal in frequency, the structure and operation of a receiver circuit that is made up of the filter 40b, the radio frequency receiver circuit devices 120 and 121, the RF-IC 3, the baseband signal processor 2 and the speaker 6, and the operation of the antenna switch 4a are identical with those in the first embodiment (FIG. 1).

The radio frequency transmitter signal TxA for the W-CDMA system, which has been outputted from the RF-IC 3, is amplified up to a desired power in the radio frequency power amplifier 10a, and transmitted to the duplexer 50 through the matching networks 20 and 21 and the switch 31. The radio frequency transmitter signal TxA is further transmitted from the antenna 5 through the antenna switch 4a from the duplexer 50.

The radio frequency transmitter signal TxB for the DCS system, which has been outputted from the RF-IC 3, is amplified up to a desired power in the radio frequency power amplifier 10a, transmitted to the antenna switch 4a through the matching networks 20 and 22 and the filter 40a, and then transmitted from the antenna 5.

In the first embodiment (FIG. 1), because the switch 30 for changing over the transmitter path is disposed in the circuit part of the watershed 500a, the transmitter paths 110 and 111 do not affect each other. However, in this embodiment, because of the provision of no switch 30, the on/off operation of the switch 31 is used so that the transmitter path for the W-CDMA system and the transmitter path for the DCS system are not affected by the impedances of each other in the case of transmitting the signal through the W-CDMA system and in the case of transmitting the signal through the DCS system.

First, in the case of transmitting the signal through the W-CDMA system, because the switch 4a is connected at the duplexer 50 side, the filter 40a and the matching network 22 that are added to the watershed 500a as a stub become an open stub. The impedance when viewing the filter 40a and the matching circuit 22 from the watershed 500a becomes high and does not affect the impedance conversion of the radio frequency transmitter signal TxA. Accordingly, in the transmitter path 110, it is easy to design a matching network that converts the impedance $Z_{out1}=Z_{inD}^*$ in impedance into the impedance $Z_{in1}^*$ by the matching networks 20, 21 and 22.

On the other hand, in the case of transmitting the signal through the DCS system, the switch 4a is connected to the filter 40a side, and the antenna switch side of the duplexer 50 is opened. When the switch 31 is on, because the duplexer 50 per se has a frequency dependency, the duplexer 50, the switch 31 and the matching network 21 which are added to the watershed 500a as the stub do not become the open stub. For that reason, the impedance when viewing the duplexer 50, the switch 31 and the matching network 21 from the watershed 500a becomes insufficiently high, and affects the impedance conversion of the radio frequency transmitter signal TxB. Accordingly, in the transmitter path 111, it is difficult to design the matching network that converts the impedance $Z_{out2}=Z_{inF}^*$ in impedance into the impedance $Z_{in2}^*$ by the matching networks 20, 22 and 21.

In this embodiment, in the case of transmitting the signal through the DCS system, the switch 31 and the matching network 21 become the open stub by turning the switch 31 that is added to the watershed 500a as the stub off, thereby preventing an influence of the radio frequency transmitter signal TxB on the impedance conversion.

Also, according to this embodiment, in the transmitter path 110, because the switch 31 is disposed in the circuit part of the $Z_{out1}$ that is high impedance, the circuit loss that is attributable to the series resistor of the switch is reduced more than that in the above first embodiment. For example, in the case where a real part of $Z_{out1}$ is 75Ω, and a series resistance of the switch 31 is 0.5Ω, an increase in the circuit loss which is attributable to the arrangement of the switch 31 is about 0.06 dB which is reduced to the half or less of about 0.17 dB which is in the case of the above first embodiment. Thus, the increase in the circuit loss which is attributable to the arrangement of the switch can be hardly ignored. The real part of the $Z_{out1}$ is not limited to 75Ω, but may be set to another value.

Also, because no switch is disposed in the transmitter path 111, there is no increase in the circuit loss which is attributable to the arrangement of the switch. Therefore, in the case where the addition of the stub to the watershed 500a is permitted, according to this embodiment, it is expected to realize the radio frequency circuit device for the multi-band and multi-mode which has a transmitter path that is further low in the circuit loss and therefore improves the transmitter circuit characteristic.

Figure 7:
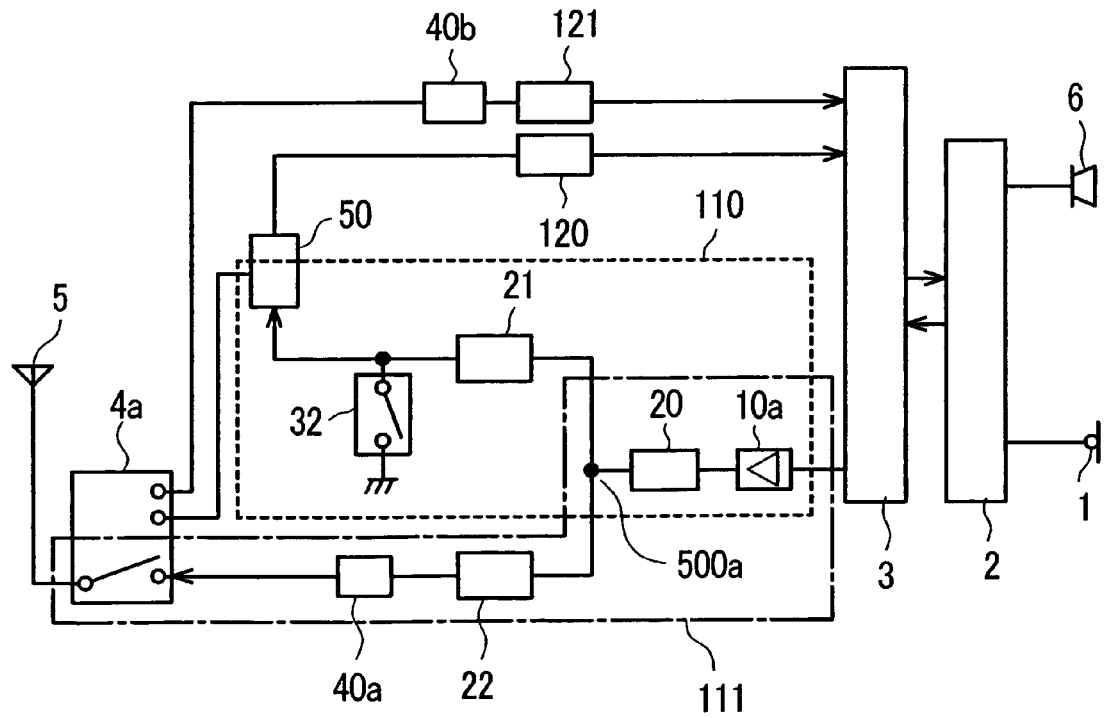
FIG. 7 is a second circuit block diagram for explaining the second embodiment of the present invention.

In this embodiment, the switch 31 is disposed in series to the transmitter path 111, but may be disposed in parallel with the switch 32 as shown in FIG. 7. The switch 32 turns off in the case of transmitting the signal through the W-CDMA system, and turns on in the case of transmitting the signal through the DCS system. In the transmitter path 111, the switches 31 and 32 can be freely selected according to the ease of design.

Third Embodiment

Figure 8:
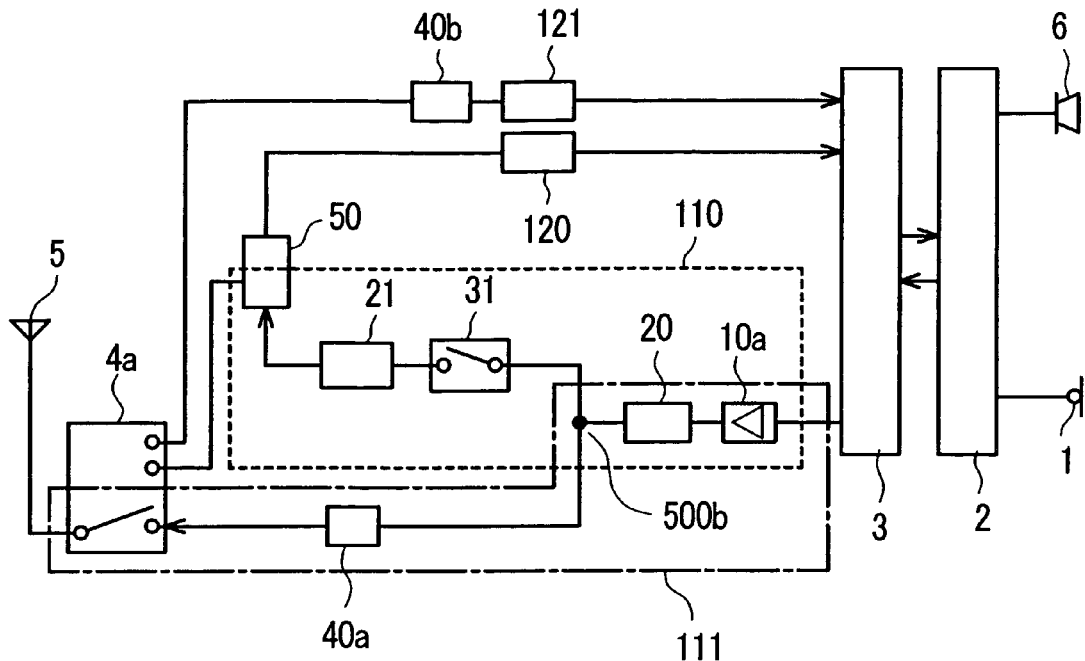
FIG. 8 is a circuit block diagram for explaining a third embodiment of the present invention.

FIG. 8 is a third embodiment of the present invention. Referring to FIG. 8, reference 500b denotes a watershed that connects the transmitter paths 110 and 111.

The circuit operation of this embodiment will be described with reference to FIG. 8. The operation of a circuit that is made up of a microphone 1, a baseband signal processor 2 and an RF-IC 3 and converts a sound signal into a radio frequency transmitter signal in frequency, the structure and operation of a receiver circuit that is made up of the filter 40b, the radio frequency receiver circuit devices 120 and 121, the RF-IC 3, the baseband signal processor 2 and the speaker 6, and the operation of the antenna switch 4a are identical with those in the first embodiment (FIG. 1).

The radio frequency transmitter signal TxA for the W-CDMA system, which has been outputted from the RF-IC 3, is amplified up to a desired power in the radio frequency power amplifier 10a, and transmitted to the duplexer 50 through the matching network 20, the switch 31 and the matching network 21. The radio frequency transmitter signal TxA is further transmitted from the antenna 5 through the antenna switch 4a from the duplexer 50.

The radio frequency transmitter signal TxB for the DCS system which has been outputted from the RF-IC 3 is amplified up to a desired power in the radio frequency power amplifier 10a, transmitted to the antenna switch 4a through the matching network 20 and the filter 40a, and then transmitted from the antenna 5.

The switch 31 turns on in the case of transmission through the W-CDMA system and turns off in the case of transmission through the DCS system in the case of the second embodiment (FIG. 6).

According to this embodiment, in the case of transmission through the W-CDMA system, the filter 40a that is added to the watershed 500b of the transmitter path 110 as a stub is a circuit that slightly converts a phase with substantially no frequency dependency with respect to the radio frequency transmitter signal TxA because the frequencies of the radio frequency transmitter signals TxA and TxB are in proximity to each other. Because the antenna switch 4a is opened, the impedance when viewing the filter 4a from the watershed 500b becomes high, and the filter 40a does not affect the impedance conversion in the transmitter path 110. Also, in the case of transmission through the DCS system, because the switch 31 turns off, the transmitter path 111 can use the same circuit as that in the first embodiment (FIG. 1).

Therefore, according to this embodiment, the transmitter paths 110 and 111 can be designed substantially independently from each other, and the design is facilitated. Also, according to this embodiment, in the transmitter path 111, because no switch is arranged, there is no increase in the circuit loss which is attributable to the arrangement of the switch.

According to this embodiment, it is expected to realize the radio frequency circuit device for the multi-band and multi-mode which is low in the circuit loss and therefore can improve the transmitter circuit characteristic, and facilitates the design.

Fourth Embodiment

Figure 9:
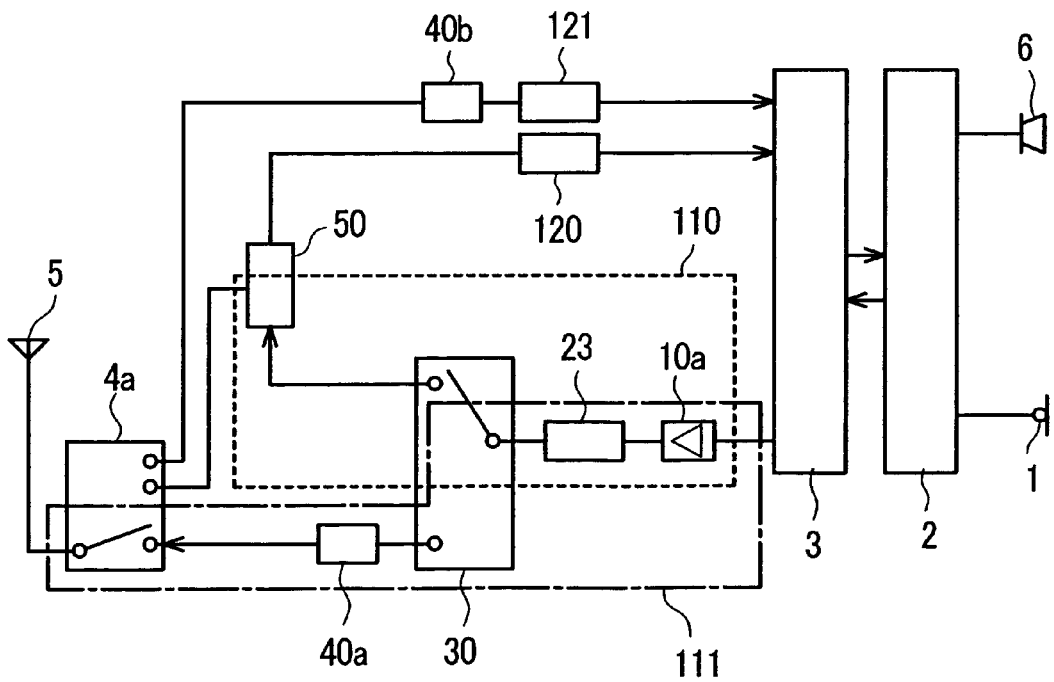
FIG. 9 is a circuit block diagram for explaining a fourth embodiment of the present invention.

FIG. 9 shows a fourth embodiment of the present invention. In FIG. 9, reference numeral 23 denotes a matching network.

The circuit operation of this embodiment will be described with reference to FIG. 9. The operation of a circuit that is made up of a microphone 1, a baseband signal processor 2 and an RF-IC 3 and converts a sound signal into a radio frequency transmitter signal in frequency, the structure and operation of a receiver circuit that is made up of the filter 40b, the radio frequency receiver circuit devices 120 and 121, the RF-IC 3, the baseband signal processor 2 and the speaker 6, and the operation of the antenna switch 4a are identical with those in the first embodiment (FIG. 1).

The radio frequency transmitter signal TxA for the W-CDMA system which has been outputted from the RF-IC 3 is amplified up to a desired power in the radio frequency power amplifier 10a, transmitted to the duplexer 50 through the matching network 23 and the switch 30. The radio frequency transmitter signal TxA is further transmitted from the antenna 5 through the antenna switch 4a from the duplexer 50.

The radio frequency transmitter signal TxB for the DCS system which has been outputted from the RF-IC 3 is amplified up to a desired power in the radio frequency power amplifier 10a, transmitted to the antenna switch 4a through the matching networks 20 and the filter 40a, and then transmitted from the antenna 5. Accordingly, the switch 30 is connected to the duplexer 50 side in the case of transmission through the W-CDMA system, and connected to the filter 40a side in the case of transmission through the DCS system.

The matching network 23 converts the impedance $Z_{out1}$ in impedance into the impedance $Z_{in1}^*$ in the frequency of the radio frequency transmitter signal TxA, and simultaneously converts the impedance $Z_{out2}$ in impedance into the impedance $Z_{in2}^*$ in the frequency of the radio frequency transmitter signal TxB. It is desirable that the matching network 23 is a variable impedance matching network taking the performance such as the power consumption of the radio frequency circuit device into consideration. However, the matching network 23 may be a fixed impedance matching network.

According to this embodiment, because one matching network is constituted and shared, the circuit area is further downsized. Also, because the switch 30 is disposed in the high impedance portion $Z_{out1}$ in the transmitter path 110, it is expected to realize the radio frequency circuit device for the multi-band and multi-mode which is low in the circuit loss and therefore can improve the transmitter circuit characteristic.

In this embodiment, the switch 30 for changing over the transmitter paths 110 and 111 is used. However, the switch 31 that cuts off only the transmitter path 110 may be used as in the second and third embodiments (FIGS. 6 and 8). In this case, in the transmitter path 111, the circuit loss does not increase because no switch is arranged. In the case of using the switch 31, it is expected to realize the radio frequency circuit device for the multi-band and multi-mode which can further reduce the circuit loss and therefore can improve the transmitter circuit characteristic.

Fifth Embodiment

Figure 10:
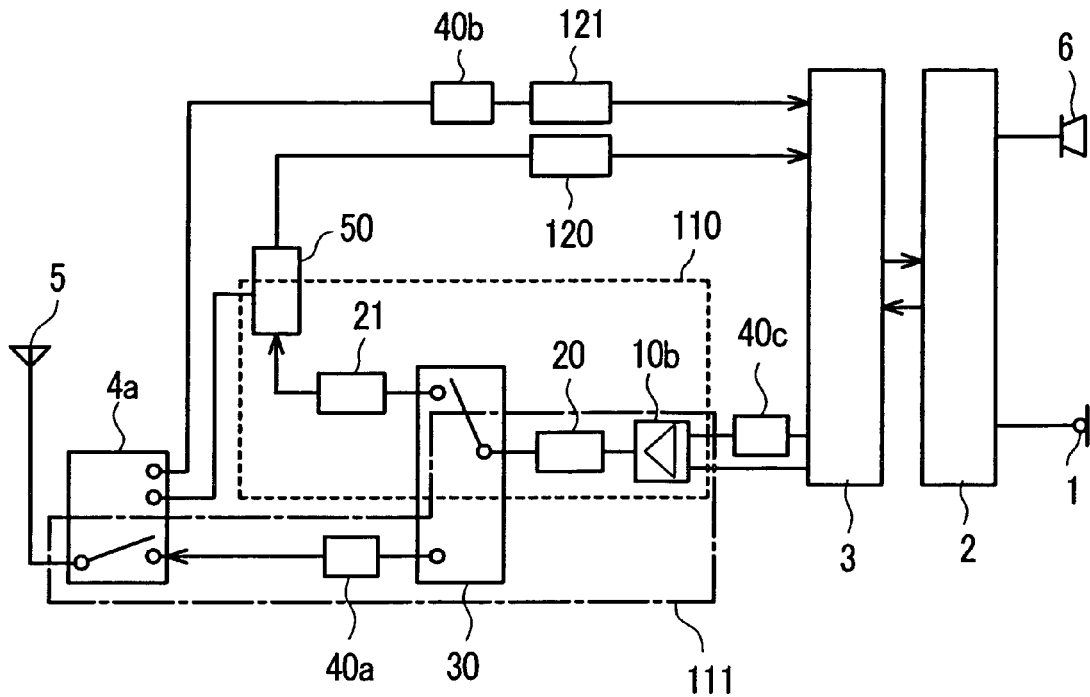
FIG. 10 is a circuit block diagram for explaining a fifth embodiment of the present invention.

FIG. 10 shows a fifth embodiment of the present invention. In FIG. 10, reference 40c denotes a filter.

The circuit operation of this embodiment will be described with reference to FIG. 10. The operation of a circuit that is made up of a microphone 1, a baseband signal processor 2 and an RF-IC 3 and converts a sound signal into a radio frequency transmitter signal in frequency, the structure and operation of a receiver circuit that is made up of the filter 40b, the radio frequency receiver circuit devices 120 and 121, the RF-IC 3, the baseband signal processor 2 and the speaker 6, and the operation of the antenna switch 4a and the switch 30 are identical with those in the first embodiment (FIG. 1).

The radio frequency transmitter signal TxA for the W-CDMA system, which has been outputted from the RF-IC 3, is transmitted to the radio frequency power amplifier 10b through the filter 40c, amplified up to a desired power in the radio frequency power amplifier 10b, and transmitted to the duplexer 50 through the matching network 20, the switch 30 and the matching network 21. The radio frequency transmitter signal TxA is further transmitted from the antenna 5 through the antenna switch 4a from the duplexer 50.

The radio frequency transmitter signal TxB for the DCS system, which has been outputted from the RF-IC 3, is transmitted to the radio frequency power amplifier 10b not through the filter 40c, amplified up to a desired power in the radio frequency power amplifier 10b, transmitted to the antenna switch 4a through the matching network 20, the switch 30 and the filter 40a, and then transmitted from the antenna 5.

According to this embodiment, inputs of the radio frequency power amplifier 10b have two paths, and the filter 40c is disposed in a path through which the radio frequency transmitter signal TxA for the W-CDMA passes. As a result, the design of the RF-IC 3 in the W-CDMA system is facilitated.

In this embodiment, the switch 30 for changing over the transmitter paths 110 and 111 is used. However, the switch 31 that cuts off only the transmitter path 110 may be used as in the second and third embodiments (FIGS. 6 and 8).

Sixth Embodiment

Figure 11:
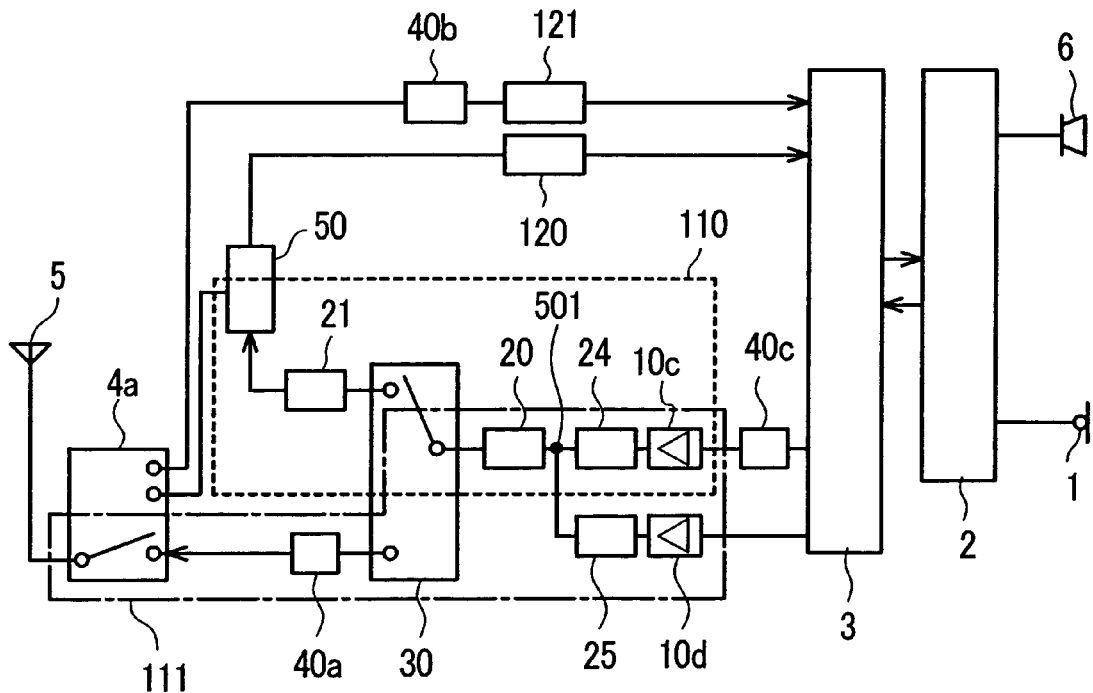
FIG. 11 is a circuit block diagram for explaining a sixth embodiment of the present invention.

FIG. 11 shows a sixth embodiment of the present invention. In FIG. 11, reference 10c and 10d denote radio frequency power amplifiers, 24 and 25 are matching networks, and 501 is a watershed of the matching networks 24 and 25 and the matching network 20.

The circuit operation of this embodiment will be described with reference to FIG. 11. The operation of a circuit that is made up of a microphone 1, a baseband signal processor 2 and an RF-IC 3 and converts a sound signal into a radio frequency transmitter signal in frequency, the structure and operation of a receiver circuit that is made up of the filter 40b, the radio frequency receiver circuit devices 120 and 121, the RF-IC 3, the baseband signal processor 2 and the speaker 6, and the operation of the antenna switch 4a and the switch 30 are identical with those in the first embodiment (FIG. 1).

The radio frequency transmitter signal TxA for the W-CDMA system, which has been outputted from the RF-IC 3, is transmitted to the radio frequency power amplifier 10c through the filter 40c, amplified up to a desired power in the radio frequency power amplifier 10c, and transmitted to the duplexer 50 through the matching networks 24 and 20, the switch 30 and the matching network 21. The radio frequency transmitter signal TxA is further transmitted from the antenna 5 through the antenna switch 4a from the duplexer 50.

The radio frequency transmitter signal TxB for the DCS system, which has been outputted from the RF-IC 3, is transmitted to the radio frequency power amplifier 10d not through the filter 40c, amplified up to a desired power in the radio frequency power amplifier 10d, transmitted to the antenna switch 4a through the matching networks 25 and 20, the switch 30 and the filter 40a, and then transmitted from the antenna 5.

Accordingly, the radio frequency power amplifier 10c, the matching networks 24, 20 and 21, and the switch 30 make up the transmitter path 110, and the radio frequency power amplifier 10d, the matching networks 25 and 20, the switch 30 and the filter 40a make up the transmitter path 111.

In the case of transmission through the W-CDMA system, the radio frequency power amplifier 10c turns on to provide a load impedance $Z_{L3ON}$, and the radio frequency power amplifier 10d turns off to provide a load impedance $Z_{L4OFF}$ of an off state. Likewise, in the case of transmission through the DCS system, the radio frequency power amplifier 10d turns on to provide a load impedance $Z_{L4ON}$, and the radio frequency power amplifier 10c turns off to provide a load impedance $Z_{L3OFF}$ of an off state.

In the case of transmission through the W-CDMA system, the impedances of the matching network 25 and the radio frequency power amplifier 10d of the off state affects the impedance matching of the transmitter path 110 that is made up of the radio frequency power amplifier 10c, the matching networks 24, 20 and 21, the switch 31 and the duplexer 50. Likewise, in the case of transmission through the DCS system, the impedances of the matching network 24 and the radio frequency power amplifier 10c of the off state affects the impedance matching of the transmitter path 111 that is made up of the radio frequency power amplifier 10d, the matching networks 25 and 20, the switch 30 and the filter 40a.

Accordingly, the matching characteristics of the matching networks 24, 20, 21 and 25 are as follows: In the transmitter path 110, the matching networks 24, 20, 21 and 25 converts the impedance $Z_{out1}$ in impedance into the impedance $Z_{in1}$* in the frequency of the radio frequency transmitter signal TxA in the state where the impedance when viewing the radio frequency power amplifier 10d side from the input terminal of the matching network 25 is $Z_{L4OFF}$* (conjugate complex number of $Z_{L4OFF}$). Likewise, in the transmitter path 111, the matching networks 25, 20, 21 and 24 converts the impedance $Z_{out2}$ in impedance into the impedance $Z_{in2}$* in the frequency of the radio frequency transmitter signal TxB in the state where the impedance when viewing the radio frequency power amplifier 10c side from the input terminal of the matching network 24 is $Z_{L3OFF}$* (conjugate complex number of $Z_{L3OFF}$).

At the output terminals of the radio frequency power amplifiers 10c and 10d, the conjugate matching $Z_{L3ON}=Z_{in1}$ and $Z_{L4ON}=Z_{in2}$ are realized.

According to this embodiment, because there are provided two paths of the radio frequency power amplifier 10c for the W-CDMA system and the radio frequency power amplifier 10d for the DCS system, the radio frequency power amplifier is readily optimized in the respective systems. Therefore, in the case where the separation of the power amplifiers according to the systems is advantageous, it can be expected to realize the radio frequency circuit device for the multi-band and multi-mode which can improve the transmitter circuit characteristic.

In this embodiment, although the switch 30 that changes over the transmitter paths 110 and 111 is used, the switch 31 that cuts off only the transmitter path 110 may be used as in the second and third embodiments (FIGS. 6 and 8).

Also, the effects of the filter 40c that is disposed between the radio frequency power amplifier 10c and the RF-IC 3 are identical with those in the fifth embodiment (FIG. 10).

Seventh Embodiment

Figure 12:
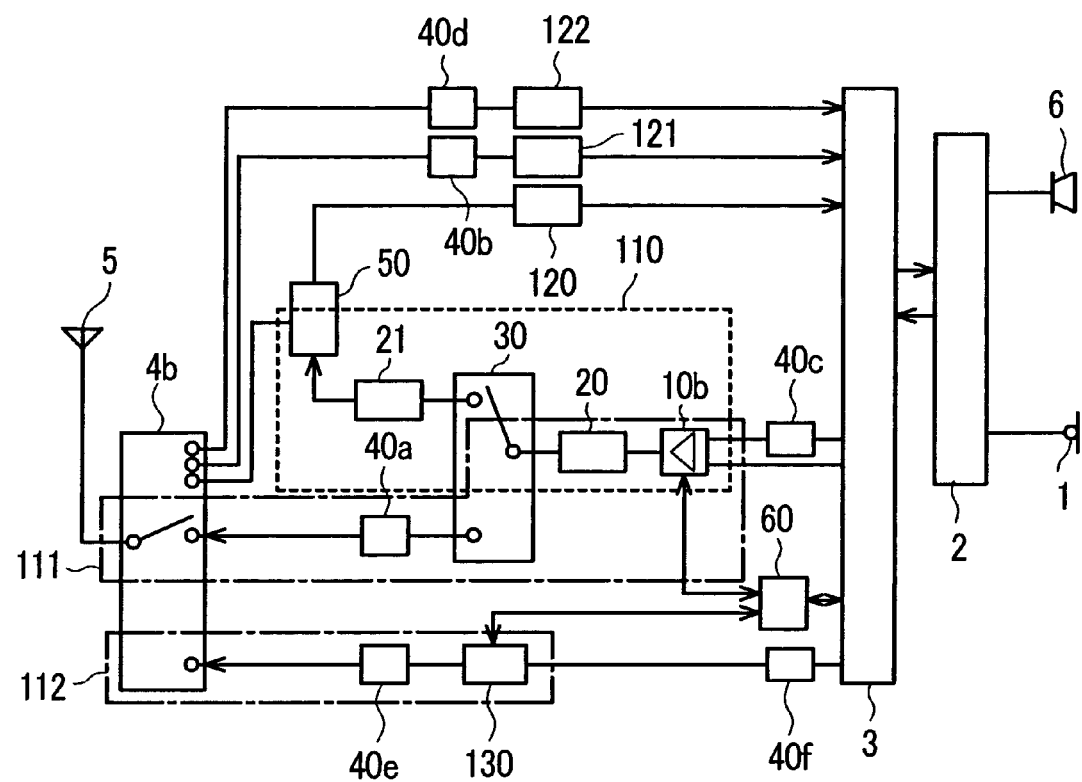
FIG. 12 is a first circuit block diagram for explaining a seventh embodiment of the present invention.

FIG. 12 shows a seventh embodiment of the present invention. Referring to FIG. 12, reference 4d denotes an antenna switch, 130 is a radio frequency transmitter circuit device, 40e is a filter, 112 is a transmitter path, 60 is a gain control device, and 40f is a filter.

In the above first to sixth embodiments (FIGS. 1 and 6 to 11), the radio frequency circuit device for the multi-band and multi-mode that responds to the W-CDMA system of 1900 MHz band and the DCS system of 1800 MHz band was described. In this embodiment, a description will be given of a radio frequency circuit device for the multi-band and multi-mode which corresponds to a GSM (global system for mobile communication) system whose transmitter frequency is 900 MHz band, and which has widely spread mainly in Europe and Asia, in addition to the above two band and two mode system. In addition, this embodiment also responds to an EDGE (enhanced data rate for GSM evolution) system that introduces a linear system to the GSM system and the DCS system in the respective frequency bands of the GSM system and the DCS system which adopt the same modulation technique. Accordingly, this embodiment responds to three band and three modes.

The circuit operation of this embodiment will be described with reference to FIG. 12. The operation of a circuit that is made up of a microphone 1, a baseband signal processor 2 and an RF-IC 3 and converts a sound signal into a radio frequency transmitter signal in frequency, and the structure and operation of a receiver circuit that is made up of the filter 40b, the radio frequency receiver circuit devices 120 and 121, the RF-IC 3, the baseband signal processor 2 and the speaker 6 are identical with those in the first embodiment (FIG. 1). Also, the structures and operations of the transmitter paths 110 and 111 in the case of transmission through the W-CDMA system and the DCS system are identical with those in the first embodiment (FIG. 1).

The radio frequency transmitter signal TxC for the GSM system which has been outputted from the RF-IC 3 is transmitted to the antenna switch 4b through the filter 40f, the radio frequency transmitter circuit device 130, and the filter 40e. Then, the radio frequency transmitter signal TxC is transmitted from the antenna 5.

On the other hand, the radio frequency receiver signal RxC for the GSM system which has been received by the antenna 5 is transmitted to the RF-IC 3 through the antenna switch 4b, the filter 40d and the radio frequency receiver circuit device 122. Then, the radio frequency receiver signal RxC is converted into the baseband receiver signal in frequency in the RF-IC 3, converted into a sound signal in the baseband signal processor 2, and outputted from the speaker 6.

Accordingly, in the case of transmission or reception through the W-CDMA system, the antenna switch 4b is connected to the duplexer 50 side. Also, in the case of transmission through the DCS system, the antenna switch 4b is connected to the filter 40a side, and in the case of reception through the DCS system, the antenna switch 4b is connected to the filter 40b side. In addition, in the case of transmission through the GSM system, the antenna switch 4b is connected to the filter 40e side, and in the case of reception through the GSM system, the antenna switch 4b is connected to the filter 40d side.

As described above, the radio frequency transmitter circuit between the RF-IC 3 and the antenna 5 has three paths consisting of the transmitter path 110 of the radio frequency transmitter signal TxA for the W-CDMA system, the transmitter path 111 of the radio frequency transmitter signal TxB for the DCS system, and the transmitter path 112 of the radio frequency transmitter signal TxC for the GSM system.

Figure 13:
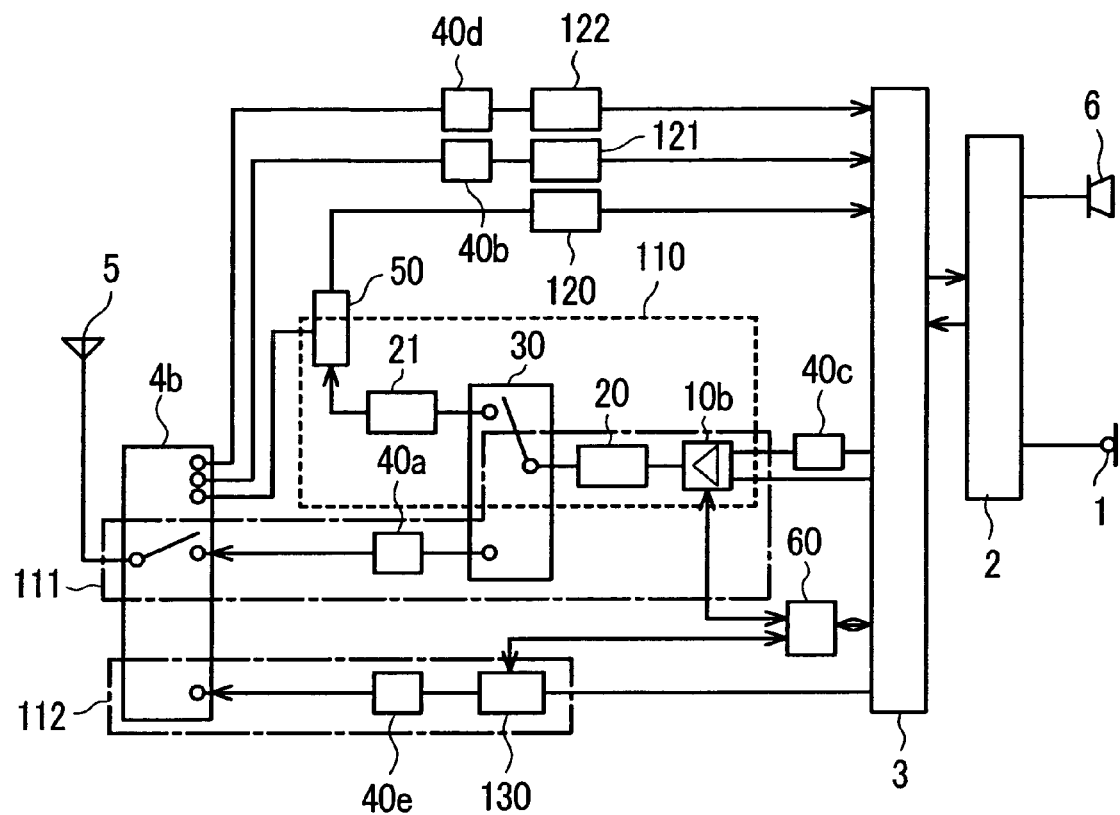
FIG. 13 is a second circuit block diagram for explaining the seventh embodiment of the present invention.

The filter 40f may not be arranged depending on the circuit type of the RF-IC 3 as shown in FIG. 13.

In the case of transmission through the EDGE system, the gain control voltage or the gain control current of a power amplifier (not shown) which makes up the radio frequency power amplifier lob and the radio frequency transmitter circuit 130 is adjusted to ensure the amplification linearity of the power amplifier. The gain control voltage or the gain control current is supplied from the gain control circuit device 60. In this case, the structure or operation of the transmitter paths 111 and 112 are identical with those of the DCS system and the GSM system.

This embodiment realizes the radio frequency circuit device for the multi-band and multi-mode that responds to three bands and three modes in total which consists of the W-CDMA system, the DCS system, the GSM system, the EDGE system in a frequency band that responds to the DCS system, and the EDGE system in a frequency band that responds to the GSM system.

In this embodiment, the switch 30 for changing over the transmitter paths 110 and 111 is used. However, the switch 31 that cuts off only the transmitter path 110 may be used as in the second and third embodiments (FIGS. 6 and 8).

Also, the effects of the filter 40c that is disposed between the radio frequency power amplifier 10b and the RF-IC 3 are identical with those in the fifth embodiment (FIG. 10).

Eighth Embodiment

Figure 14:
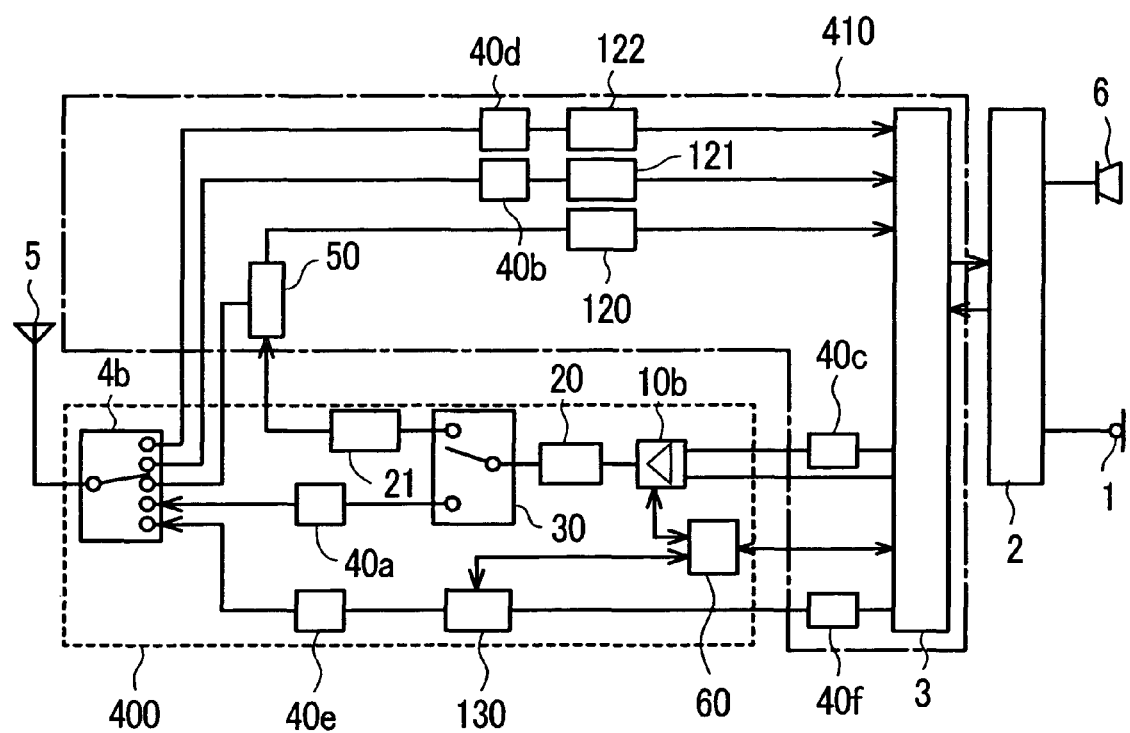
FIG. 14 is a first circuit block diagram for explaining an eighth embodiment of the present invention.
Figure 15:
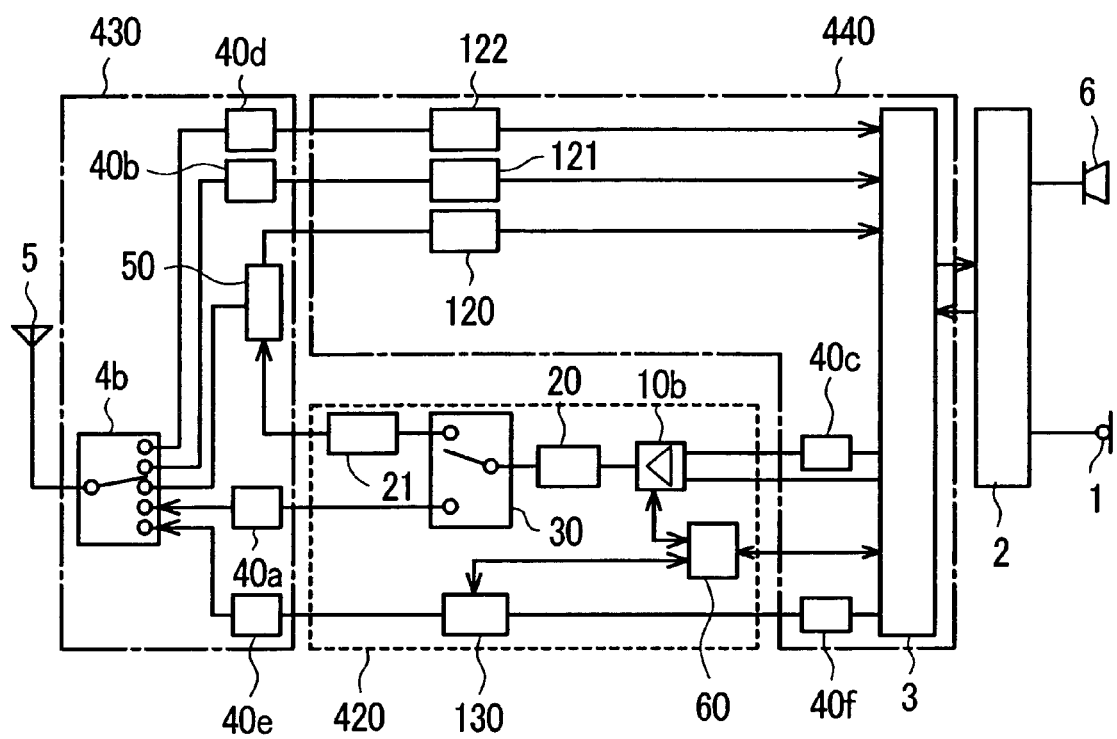
FIG. 15 is a second circuit block diagram for explaining the eighth embodiment of the present invention.

FIGS. 14 and 15 show an eighth embodiment of the present invention. This embodiment is shown as the radio frequency circuit device and the mobile communication terminal of the seventh embodiment (FIG. 12) including a plurality of circuit blocks.

Referring to FIG. 14, reference numeral 400 denotes a circuit block that is mainly made up of transmitter paths, and 410 is a circuit block that is mainly made up of receiver paths. The radio frequency circuit device according to this embodiment includes the circuit block 400 and the circuit block 410. The mobile communication device according to this embodiment is made up of the antenna 5, the baseband signal processor 3, the microphone 1 and the speaker 6 in addition to the above radio frequency circuit device.

In this case, because the circuit block 400 mainly including the transmitter paths and the circuit block 410 mainly including the receiver paths can be disposed separately within the mobile communication terminal, it is easy to isolate the respective circuit blocks from each other thermally or electromagnetically.

In FIG. 15, reference numeral 420 denotes a circuit block that mainly includes a radio frequency power amplifier, 430 is a circuit block that mainly includes a front end such as the filter and the antenna switch, and 440 is a circuit block that mainly includes the receiver path. The radio frequency circuit device according to this embodiment includes the circuit block 420, the circuit block 430 and the circuit block 440, and the mobile communication device according to this embodiment includes the antenna 5, the baseband signal processor 3, the microphone 1 and the speaker 6 in addition to the above radio frequency circuit device.

In this case, because the circuit block 420 mainly including the radio frequency power amplifier and the circuit block 430 mainly including the filter can be disposed separately within the mobile communication terminal, it is easy to isolate the respective circuit blocks from each other thermally.

The circuit blocks 400 to 440 can make up, for example, a radio frequency module, respectively. The radio frequency module is realized, for example, by mounting a bear chip (amplifier, RF-IC, switch) or a chip component (condenser, resistor, inductor) which are formed of semiconductor devices on the same radio frequency circuit board made of ceramic or resin having a radio frequency line.

This embodiment shows two modes of FIGS. 14 and 15. However, the present invention is not limited to those modes, and may be applied to any mode if the effects shown in the eighth embodiment are realized.

Also, the radio frequency circuit device made up of the circuit blocks or the radio frequency modules is not limited to the seventh embodiment, but may be formed of the radio frequency circuit devices shown in the first to sixth embodiments (FIG. 1, and FIGS. 6 to 11). The same circuit block construction or radio frequency module construction can be realized.

As was described above, according to the present invention, there can be realized a radio frequency circuit device that is small in the circuit loss which responds to the multi-band and multi-mode, and a mobile communication terminal using the radio frequency circuit device.

It is further understood by those skilled in the art that the foregoing description is a preferred embodiment of the disclosed device and that various changes and modifications may be made in the invention without departing from the spirit and scope thereof.

What is claimed is:

1. A radio frequency device, comprising:
a first amplifier that amplifies a first signal of a first modulation technique in power;
a second amplifier that amplifies a second signal of a second modulation technique in power;
a first matching network that is connected to an output terminal of the first amplifier;
a second matching network that is connected to an output terminal of the second amplifier;
a third matching network that is connected to both an output terminal of the first matching network and an output terminal of the second matching network
a first path that includes a duplexer between the third matching network and an antenna, and allows the first amplifier to be coupled with the antenna through the first and third matching networks and the duplexer; and
a second path that does not include the duplexer and allows the second amplifier to be coupled with the antenna through the second and third matching networks,
wherein the first path is selected when the first amplifier amplifies the first signal, and the second path is selected when the second amplifier amplifies the second signal,
wherein a first terminal of a switch through which the third matching network and the duplexer are electrically connected has a first impedance when the first path is selected, said first impedance being dependent on an impedance of said duplexer,
wherein a second terminal of the switch at which the third matching network and the antenna are electrically connected has a second impedance when the second path is selected, said second impedance being dependent on an impedance of said switch,
wherein the first impedance is different from the second impedance,
wherein the first path has a third impedance when viewing the antenna side from the output terminal of the first amplifier,
wherein the second path has a fourth impedance when viewing the antenna side from the output terminal of the second amplifier,
wherein the third impedance is different from the fourth impedance, and wherein the first amplifier amplifies the first signal on the third impedance, and the second amplifier amplifies the second signal on the fourth impedance.

2. The radio frequency circuit device according to claim 1, wherein the switch operates to select between the first path and the second path (switch in FIG. 6).

3. A radio frequency circuit device, comprising:
a first amplifier that amplifies a first transmitter signal of a first modulation technique in power;
a second amplifier that amplifies a second transmitter signal of a second modulation technique in power;
a first matching network that is connected to an output terminal of the first amplifier;
a second matching network that is connected to an output terminal of the second amplifier;
a third matching network that is connected to both an output terminal of the first matching network and an output terminal of the second matching network;
a first path that includes a duplexer between the third matching network and an antenna, and that allows the first amplifier to be coupled with the antenna through the first and third matching networks and the duplexer; and
a second path that does not include the duplexer and that allows the second amplifier to be coupled with the antenna through the second and third matching networks;
wherein the first path is selected when the first amplifier amplifies the first transmitter signal, and the second path is selected when the second amplifier amplifies the second transmitter signal,
wherein a first terminal of a switch through which the third matching network and the duplexer are electrically connected has a first impedance when the first path is selected, said first impedance being dependent on an impedance of said duplexer,
wherein a second terminal of the switch at which the third matching network and the antenna are electrically connected has a second impedance when the second path is selected, said second impedance being dependent on an impedance of said switch,
wherein the first impedance is different from the second impedance,
wherein the first path has a third impedance when viewing the antenna side from the output terminal of the first amplifier,
wherein the second path has a fourth impedance when viewing the antenna side from the output terminal of the second amplifier,
wherein the third impedance is different from the fourth impedance, and
wherein the first amplifier amplifies the first signal on the third impedance, and the second amplifier amplifies the second signal on the fourth impedance.

4. The radio frequency circuit device according to claim 3, wherein the switch operates to select between the first path and the second path.

* * * * *